US008150955B2

United States Patent
Busch et al.

(10) Patent No.: US 8,150,955 B2
(45) Date of Patent: Apr. 3, 2012

(54) WIRELESS LAN WITH CHANNEL SWAPPING BETWEEN DFS ACCESS POINTS

(75) Inventors: Patrick Busch, Veldhoven (NL); Richa Malhotra, Twente (NL)

(73) Assignee: Agere Systems Inc., Allentown, PA (US)

( * ) Notice: Subject to any disclaimer, the term of this patent is extended or adjusted under 35 U.S.C. 154(b) by 121 days.

(21) Appl. No.: 12/274,458

(22) Filed: Nov. 20, 2008

(65) Prior Publication Data

US 2009/0092101 A1 Apr. 9, 2009

Related U.S. Application Data

(63) Continuation of application No. 10/141,189, filed on May 8, 2002, now Pat. No. 7,499,964.

(30) Foreign Application Priority Data

May 8, 2001 (EP) .................. 01304146

(51) Int. Cl.
G06F 15/173 (2006.01)
H04W 4/00 (2009.01)
H04W 72/00 (2009.01)
H04J 3/16 (2006.01)

(52) U.S. Cl. ........ 709/223; 709/224; 370/329; 370/437; 455/450

(58) Field of Classification Search .................. 709/200, 709/223, 224; 370/328, 327, 437; 455/450
See application file for complete search history.

(56) References Cited

U.S. PATENT DOCUMENTS

| 5,455,821 | A | * | 10/1995 | Schaeffer et al. ............. 370/332 |
| 5,603,093 | A | | 2/1997 | Yoshimi et al. .............. 455/63.1 |
| 5,701,585 | A | | 12/1997 | Kallin et al. .................. 455/437 |
| 5,724,346 | A | | 3/1998 | Kobayashi et al. ........... 370/329 |
| 5,732,077 | A | | 3/1998 | Whitehead .................... 370/349 |

(Continued)

FOREIGN PATENT DOCUMENTS

EP 0903 891 8/1999

OTHER PUBLICATIONS

Non-Final Office Action; Mailed Jun. 23, 2005 for corresponding U.S. Appl. No. 10/141,189, filed May 8, 2002.

(Continued)

*Primary Examiner* — Asghar Bilgrami
(74) *Attorney, Agent, or Firm* — Mendelsohn, Drucker & Associates, P.C.; Steve Mendelsohn

(57) ABSTRACT

The present invention enhances the dynamic frequency selection 9DFS) algorithms used in Wireless LANs by adding a channel swapping mechanism. The aim of the traditional DFS algorithm is to dynamically select channels in a wireless LAN in such a way that the best performance is achieved. However, not always the optimal channel selection is achieved. This invention describes an addition to the DFS algorithm in such a way that two APs can decide to swap channels instead of one AP switching to another channel. To avoid the problem of sub-optimal channel selection, a requesting AP sends Swap Requests to other APs in order to sense the willingness of other APs to swap channels with the requesting AP.

12 Claims, 8 Drawing Sheets

U.S. PATENT DOCUMENTS

| | | | |
|---|---|---|---|
| 5,845,209 A * | 12/1998 | Iwata | 455/423 |
| 5,859,839 A | 1/1999 | Ahlenius et al. | 370/252 |
| 5,859,841 A | 1/1999 | Gitlits | 370/335 |
| 5,933,420 A * | 8/1999 | Jaszewski et al. | 370/329 |
| 6,049,715 A | 4/2000 | Willhoff et al. | 455/436 |
| 6,101,176 A | 8/2000 | Honkasalo et al. | 370/335 |
| 6,108,552 A * | 8/2000 | Edwards et al. | 455/452.1 |
| 6,118,788 A | 9/2000 | Kermani et al. | 370/461 |
| 6,208,627 B1 | 3/2001 | Menon et al. | 370/328 |
| 6,278,688 B1 | 8/2001 | Suutari et al. | 370/217 |
| 6,311,068 B1 * | 10/2001 | Leung et al. | 455/447 |
| 6,707,820 B1 * | 3/2004 | Arndt et al. | 370/395.2 |
| 6,791,959 B1 | 9/2004 | Palmer et al. | 370/332 |
| 6,807,146 B1 * | 10/2004 | McFarland | 370/208 |
| 6,834,045 B1 | 12/2004 | Lappetelainen et al. | 370/329 |
| 6,950,658 B2 | 9/2005 | Minnick et al. | 455/445 |
| 2002/0105930 A1 | 8/2002 | Sydon et al. | 370/337 |
| 2004/0090933 A1 | 5/2004 | McFarland et al. | 370/328 |

OTHER PUBLICATIONS

Non-Final Office Action; Mailed Dec. 27, 2005 for corresponding U.S. Appl. No. 10/141,189, filed May 8, 2002.

Final Office Action; Mailed May 15, 2006 for corresponding U.S. Appl. No. 10/141,189, filed May 8, 2002

Advisory Action; Mailed Aug. 9, 2006 for corresponding U.S. Appl. No. 10/141,189, filed May 8, 2005.

Non-Final Office Action: Apr. 6, 2007 for corresponding U.S. Appl. No. 10/141,189, filed May 8, 2002.

Final Office Action; Mailed Sep. 24, 2007 for corresponding U.S. Appl. No. 10/141,189, filed May 8, 2002.

Final Office Action; Mailed Jan. 8, 2008 for corresponding U.S. Appl. No. 10/141,189, filed May 8, 2002.

Non-Final Office Action; Mailed Apr. 10, 2008 for corresponding U.S. Appl. No. 10/141,189, filed May 8, 2002.

Notice of Allowance and Fees Due; Mailed Sep. 30, 2008 for corresponding U.S. Appl. No. 10/141,189, filed May 8, 2002.

* cited by examiner

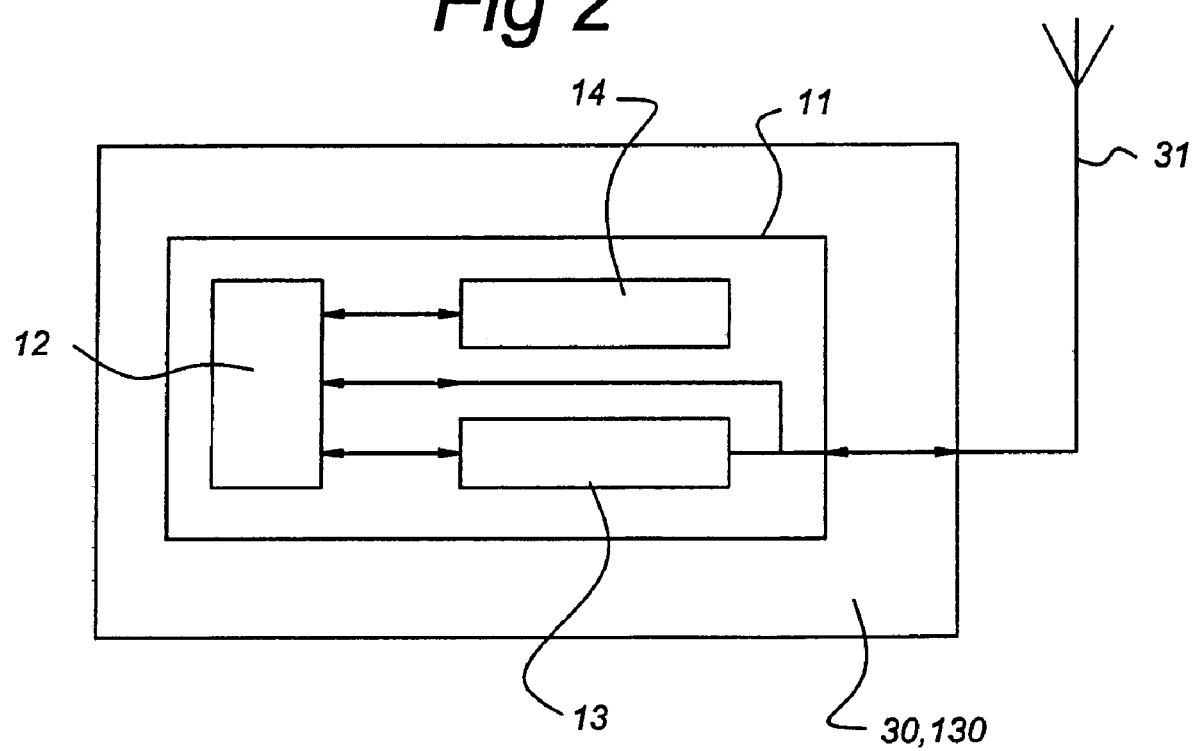

WIRELESS LAN WITH CHANNEL SWAPPING BETWEEN DFS ACCESS POINTS

CROSS-REFERENCE TO RELATED APPLICATION

This application is a continuation of U.S. application Ser. No. 10/141,189, filed on May 8, 2002 and issued as U.S. Pat. No. 7,499,964, which itself claims priority of European Patent Application No. 01304146.2, which was filed on May 8, 2001, the contents of both of which are incorporated herein by reference in their entireties.

FIELD OF THE INVENTION

The present invention relates to a communication system comprising a plurality of access points (APs) and network stations, each said network station being arranged to communicate with one of said access points through a wireless communication protocol. The invention also relates to access points for such a communication system.

BACKGROUND OF THE INVENTION

Wireless local area networks (LANs) have been developed as an enhanced replacement for wired LANs. In a wireless LAN for data-communication a plurality of (mobile) network stations (e.g., personal computers, telecommunication devices, etc.) are present that are capable of wireless communication. As compared to wired LANs, data-communication in a wireless LAN can be more versatile, due to the flexibility of the arrangement of network stations in the area covered by the LAN, and due to the absence of cabling connections.

Wireless LANs are generally implemented according to the standard as defined by the ISO/IEC 8802-11 international standard (IEEE 802.11). IEEE 802.11 describes a standard for wireless LAN systems that will operate in the 2.4-2.5 GHz ISM (industrial, scientific and medical) band. This ISM band is available worldwide and allows unlicensed operation for spread spectrum systems. For both the US and Europe, the 2,400-2,483.5 MHz band has allocated, while for some other countries, such as Japan, another part of the 2.4-2.5 GHz ISM ban has been assigned. The IEEE 802.11 standard focuses on the MAC (medium access control) and PHY (physical layer) protocols for AP based networks and adhoc networks.

In AP based wireless networks, the stations within a group or cell can communicate only directly to the AP. This AP forwards messages to the destination station within the same cell or through the wired distribution system to another AP, from which such messages arrive finally at the destination station. In ad-hoc networks, the stations operate on a peer-to-peer level and there is no AP or (wired) distribution system.

The 802.11 standard supports three PHY protocols: DSSS (direct sequence spread spectrum), FHSS (frequency hopping spread spectrum), and infrared with PPM (pulse position modulation). All these three PHYS provide bit rates of 1 and 2 Mbit/s. Furthermore, IEEE 802.11 includes extensions 11a and 11b which allow for additional higher bit rates: Extension 11b provides bit rates 5.5 and 11 Mbit's as well as the basic DSSS bit rates of 1 and 2 Mbit/s within the same 2.4-2.5 GHz ISM band. Extension 11a provides a high bit rate OFDM (orthogonal Frequency Division Multiplexing modulation) PHY standard providing bit rates in the range of 6 to 54 Mbit/s in the 5 GHz band.

The IEEE 802.11 basic MAC protocol allows interoperability between compatible PHYs through the use of the CSMA/CA (carrier sense multiple access with collision avoidance) protocol and a random back-off time following a busy medium condition. The IEEE 802.11 CSMA/CA protocol is designed to reduce the collision probability between multiple stations accessing the medium at the same time. Therefore, a random back-off arrangement is used to resolve medium contention conflicts. In addition, the IEEE 802.11 MAC protocol defines special functional behaviour for fragmentation of packets, medium reservation via RTS/CTS (request-to-send/clear-to-send) polling interaction and point coordination (for time-bounded services).

Moreover, the IEEE 802.11 MAC protocol defines Beacon frames sent at regular intervals by the AP to allow stations to monitor the presence of the AP. The IEEE 802.11 MAC protocol also gives a set of management frames including Probe Request frames which are sent by a station and are followed by the Probe Response frames sent by an available AP. This protocol allows a station to actively scan for APs operating on other frequency channels and for the APs to show to the stations what parameter settings the APs are using.

Every DSSS AP operates on one channel. The number of channels depends on the regulatory domain in which the wireless LAN is used (e.g. 11 channels in the U.S. in the 2.4 GHz band). The number can be found in ISO/IEC 8802-011, ANSI/IEEE Std 802.11 Edition 1999-00-00. Overlapping cells using different channels can operate simultaneously without interference if the channel distance is at least 3. Non-overlapping cells can always use the same channels simultaneously without interference. Channel assignment can be dynamic or fixed. Dynamic channel assignment is preferable, as the environment itself is dynamic as well.

SUMMARY OF THE INVENTION

The present invention relates to an access point for a wireless LAN communication network, arranged to:

monitor its access point traffic load send probe requests and probe responses to other access points receive probe requests and probe responses from other access points include information on the traffic load in the probe responses calculate and store an interference parameter for each of a plurality of its possible channels calculate and store a channel sharing parameter for each of the plurality of channels calculate a regular channel quality parameter for each of the plurality of channels, indicative of the amount of interference and channel sharing on each of the plurality of channels, using the interference and channel sharing parameters dynamically select an optimum channel from the plurality of possible channels using the regular channel quality parameters, wherein the access point is arranged to select the optimum channel by mutually swapping channels with another access point using a swapping mechanism.

By introducing a swapping option between adjacent access points, the present invention provides a better overall performance for the wireless LAN.

Moreover, the present invention relates to a wireless LAN communication network, comprising at least two access points as described above.

Furthermore, the present invention relates to a method of selecting an optimum channel by an access point in a wireless LAN communication network, comprising the steps of:
- monitor its access point traffic load
- send probe requests and probe responses to other access points
- receive probe requests and probe responses from other access points
- include information on the traffic load in the probe responses
- calculate and store an interference parameter for each of a plurality of its possible channels
- calculate and store a channel sharing parameter for each of the plurality of channels
- calculate a regular channel quality parameter for each of the plurality of channels, indicative of the amount of interference and channel sharing on each of the plurality of channels, using the interference and channel sharing parameters
- dynamically select an optimum channel from the plurality of possible channels using the regular channel quality parameters, wherein the access point is arranged to select the optimum channel by mutually swapping channels with another access point using a swapping mechanism.

The present invention also relates to a computer program product to be loaded by an access point for a wireless LAN communication network, the computer program product providing the access point with the capacity to:
- monitor its access point traffic load
- send probe requests and probe responses to other access points
- receive probe requests and probe responses from other access points
- include information on the traffic load in the probe responses
- calculate and store an interference parameter for each of a plurality of its possible channels
- calculate and store a channel sharing parameter for each of the plurality of channels
- calculate a regular channel quality parameter for each of the plurality of channels, indicative of the amount of interference and channel sharing on each of the plurality of channels, using the interference and channel sharing parameters
- dynamically select an optimum channel from the plurality of possible channels using the regular channel quality parameters, wherein the access point is arranged to select the optimum channel by mutually swapping channels with another access point using a swapping mechanism.

Moreover, the present invention relates to a data carrier provided with a computer program product as described above.

BRIEF DESCRIPTION OF THE DRAWINGS

Below, the invention will be explained with reference to some drawings, which are, intended for illustration purposes only and not to limit the scope of protection as defined in the accompanying claims.

FIG. 2 shows a block diagram of the arrangement of the present invention for a wireless LAN interface card.

DESCRIPTION OF PREFERRED EMBODIMENTS

Figure 1A:
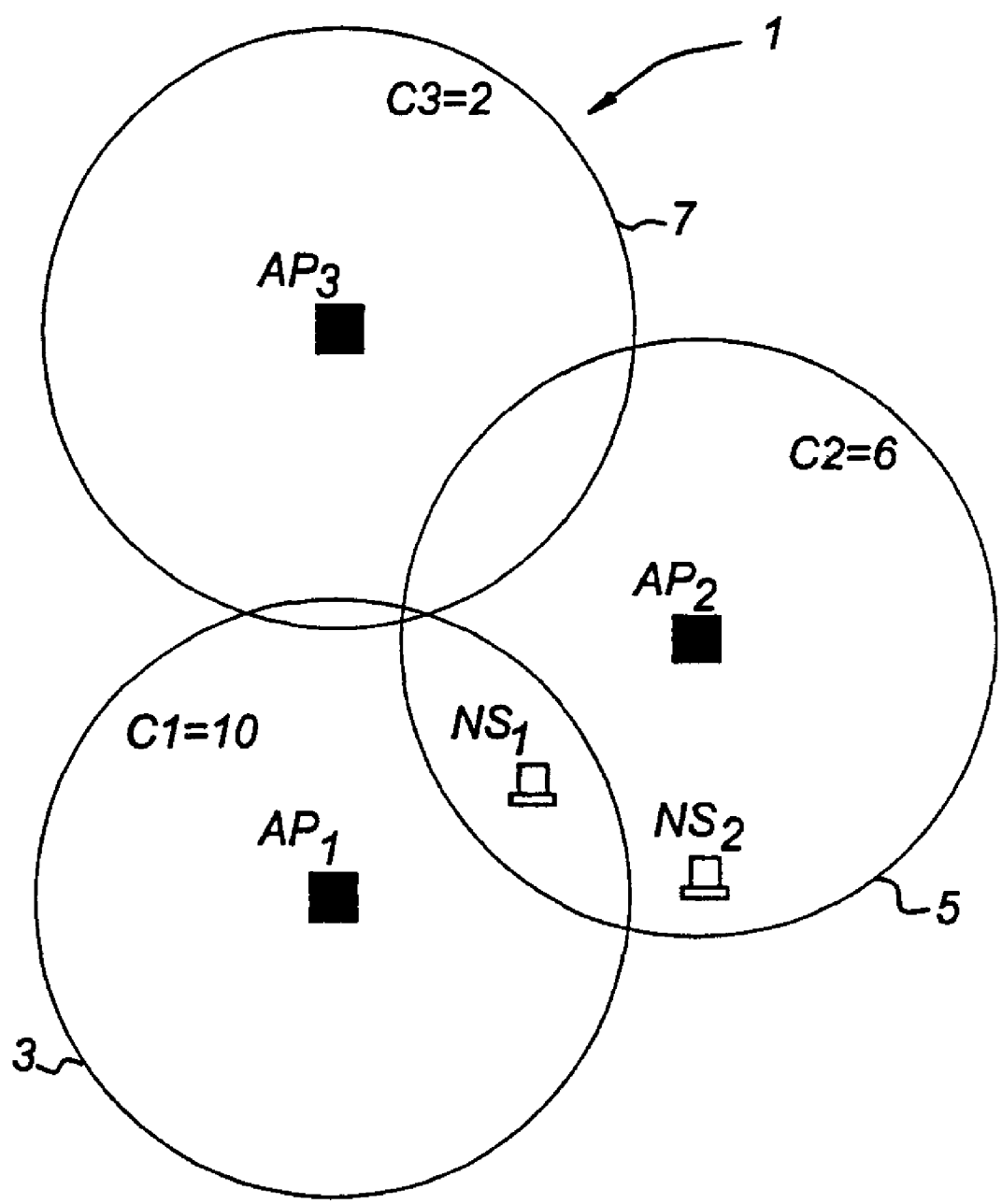
FIG. 1a shows the cells of three APs in a wireless LAN in the Prior Art.

In the co-owned, co-pending, U.S. patent application Ser. No. 10/140,689, filed 8 May 2002, entitled "Network System Comprising Access Point" (our reference Awater 12-23-14), the contents of which are incorporated by reference herein, dynamic assignment of channels is called dynamic frequency selection (DFS). The aim of the DFS algorithm is to dynamically assign channels in a wireless LAN in such a way that the best performance is achieved. Performance can be expressed in terms of throughput, delay and fairness. An AP with dynamic frequency selection is able to switch its channel in order to obtain a better operating channel. It will usually choose a channel with less interference and channel sharing than that on the current channel.

In the algorithm of the Awater 12-23-14 application, the amount of interference an AP is experiencing on a certain channel X, is expressed by a parameter I(X). Channel sharing is expressed by a parameter CS(X). The values of CS(X) are combined to calculate a so-called Channel Sharing and Interference Quality CSIQ(X). The value of CSIQ(X) is a measure for the amount of interference and channel sharing belonging to a certain channel X. In one embodiment:

$$CS(X) = \text{Share}(RX\_L(X)) * \text{Load}(X)$$

and $$I(X) = \text{Noise\_L}(j) + \sum_{j=1}^{X-1} Y(j) + \sum_{j=X+1}^{N} Y(j)$$

where:

$Y(j)=(RX\_L(j)-RJ(j-X))*\text{Load}(j)$,

RX_L(X) corresponds to a reception level of a response signal with channel frequency X, Share (RX_L(X)) equals 0 if RX_L(X) is below 10 dB under the signal detection threshold, Share (RX_L(X)) equals 0.1 if RX_L(X) is above 10 dB and under 9 dB below the signal detection threshold, Share (RX_L(X)) equals i/10 if RX_L(X) is above 10−i+1 dB and under 10-i dB below the signal detection threshold, for i=2, . . . , 8, Share (RX_L(X)) equals 0.9 if RX_L(X) is above 2 dB and under 1 dB below the signal detection threshold, Share (RX_L(X)) equals 1 if RX_L(X) is above 1 dB below the signal detection threshold, Load(X) corresponds to the load on channel frequency X, Noise_L(j) corresponds to the noise level of channel frequency j, N is the total number of channel frequencies, RX_L(j) corresponds to a reception level of a response signal with channel frequency j, RJ(j−X) corresponds to a rejection level of a signal with channel frequency j on channel frequency X, and Load(j) corresponds to the load on channel frequency j.

In the Awater 12-23-14 application, an AP will switch to a channel Y if the value of CSIQ(Y) is the highest of all the values CSIQ(X) of the channels X=1, . . . N with the number of available channels. So the best channel quality is represented by the highest CSIQ(X). The functioning of the DFS algorithm in the Awater 12-23-14 application, will be explained in an example with help of FIGS. 1a and 1b. The wireless LAN 1, shown in FIG. 1a, comprises a number of access points of which three access points AP1, AP2, AP3 are shown. These access points serve as access point for their respective cells 3,5,7 which are each schematically depicted by a circle around their respective access point. In the initial situation, the access points AP1, AP2, AP3 are communicating with their network stations on channels C1, C2, C3, respectively. The cells 3,5,7 may have different sizes. Cell size is depending on the desired coverage area of an access point and on the requirements of data throughput in the cell. The cell size can be controlled by suitable setting of the levels of the defer behaviour threshold and carrier sense detection threshold as known from EP-A-0903891. For example, a cell may comprise a number of network stations, NS1, NS2 that require high throughputs. In that case, the cell size should be small such that other network stations will be left out of the cell as much as possible. In another case, for example, in a cell only few network stations with low throughput requirements will be present. Then, a single large cell comprising these network stations will be sufficient to handle all data traffic related to that cell. FIG. 1a shows the initial situation of a wireless LAN 1 comprising three DFS-capable Aps. In the LAN 1a plurality of network stations NS1, NS2 is present of which only two are shown. In FIG. 1a, for example, the network station NS1 is communicating with the access point AP1 for all its data traffic. The network station NS1 itself continuously monitors the communication quality (i.e. the difference between signal reception level and average noise level) of its communication with the access point AP1. As long as a good communication quality for the associated access point AP1 is maintained, the network station NS1 stays communicating with AP1. When the communication quality decreases below a predetermined level, the network station NS1 starts to search for another cell 5 (an access point AP2) with a better communication quality. To this purpose, the network station NS1 is probing the associated access point AP1 and all other access points (i.e. AP2) within range, as known to persons skilled in the art. In this procedure the network station NS1 uses the signal reception level of Beacon frames received from the associated access point AP1 and Probe Response frames from the other access point AP2. The Probe Response frames are received by the network station NS1 following Probe Request frames sent by the network station NS1. As known from IEEE 802.11, the other access point AP2 will be operating on a channel with another frequency than the one of access point AP1. Network station NS2, shown in FIG. 1a, is communicating with AP2. When the communication quality decreases, this network station NS2 also will start to search for another cell with a better communication quality but will not be able to find a better AP so network station NS2 will stay communicating with AP2.

Figure 1B:
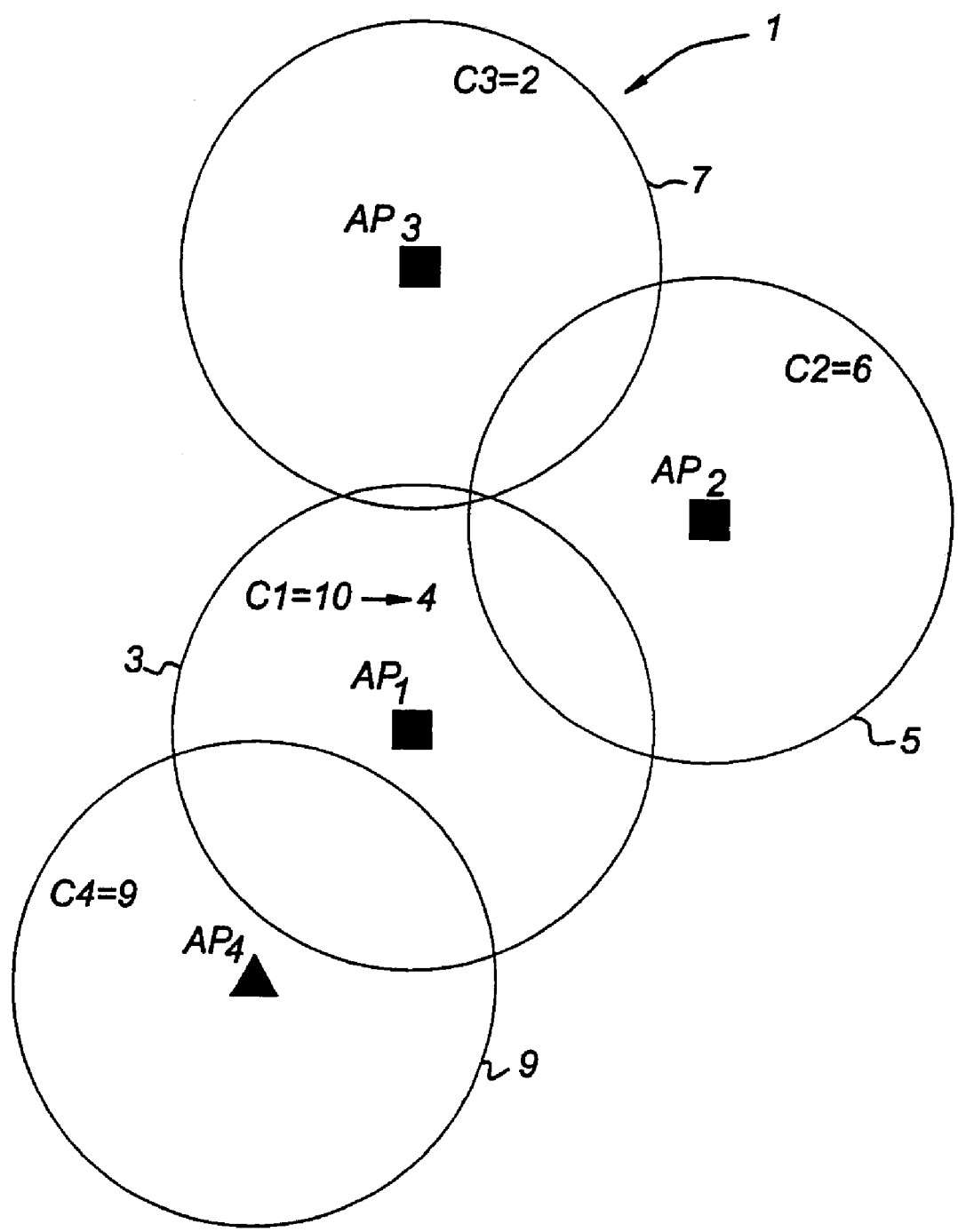
FIG. 1b shows the cells of four APs in a wireless LAN in the Prior Art.

FIG. 1b shows the situation where a non-DFS access point AP4 using, for example channel 9, has arrived within the range of the DFS-capable AP1. With the DFS algorithm of the Awater 12-23-14 application, access point AP1, operating on channel 10, will switch to channel 4 or to channel 11 in order to have at least a channel distance of 2 with every neighboring cell.

A problem of the DFS algorithm described in the Awater 12-23-14 application is the inability to optimize the overall performance. All Aps in a wireless LAN will currently optimize their own performance and will not take performance of other APs into consideration. It may well be that, from a network point of view, the division of the channels over the difference APs is not optimal.

Figure 1C:
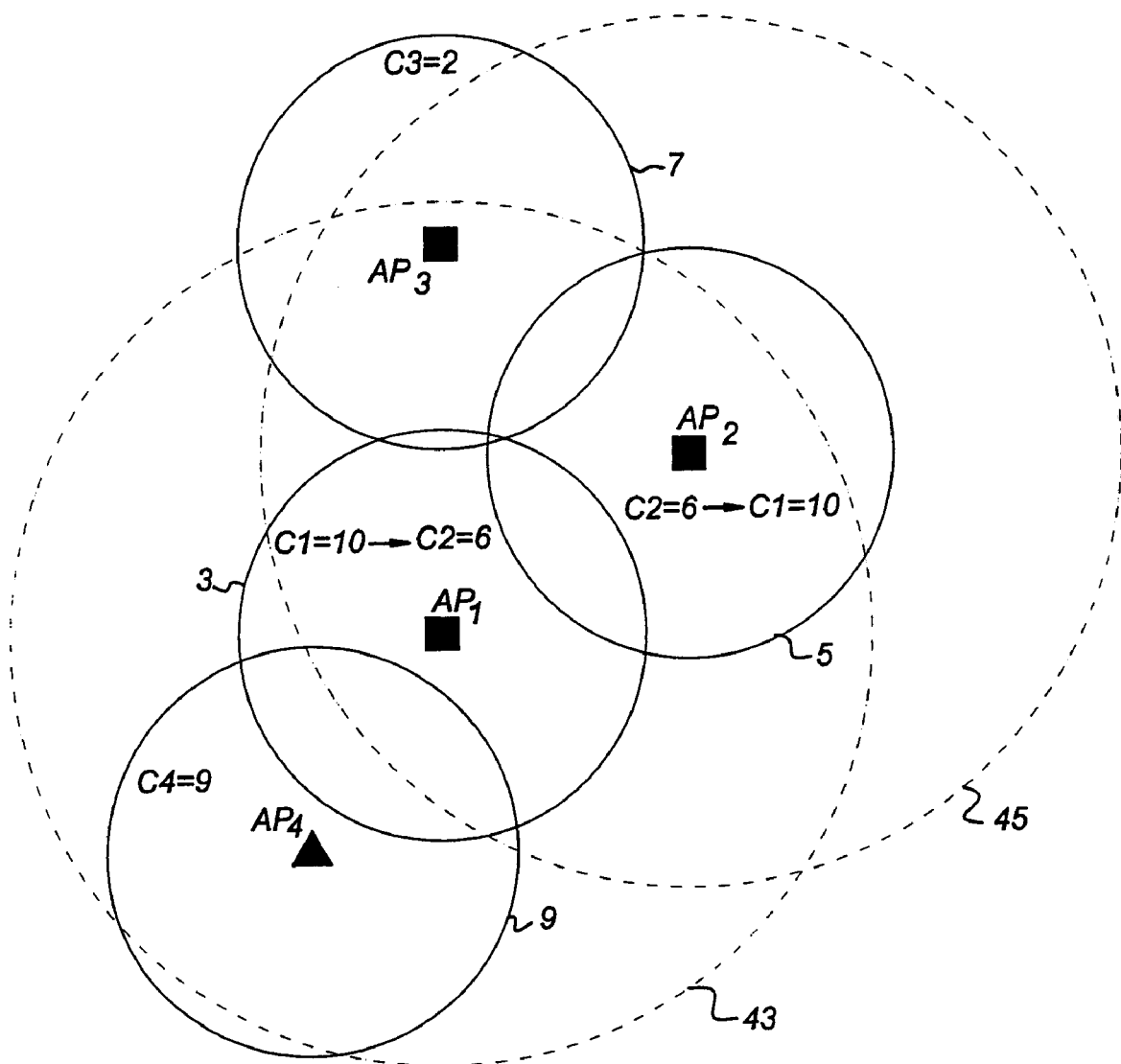
FIG. 1c shows the cells of four APs in a wireless LAN as described in the invention.

In FIG. 1c a schematic overview of a preferred embodiment is shown. A wireless LAN1 comprises a set of access points AP1, AP2, AP3 which have overlapping cells 3,5,7. In this way (mobile) network stations are able to communicate with an AP in a continuous area. Besides LAN1 a fourth access point AP4 is present having an accompanying cell 9. As in the situation described with reference to FIG. 1b, it is assumed that AP4 is a non-DFS AP. However, it should be understood that AP4 may be any kind of radio source acting on channel C4. The circles 43 and 45 depict the positions in which the receive level equals the lowest possible carrier detect threshold of respectively AP1 and AP2.

FIG. 2 shows an example of a block diagram of an arrangement of the present invention for a medium access controller (MAC) device 11 on a wireless LAN interface card 30 installed in network station NS1, NS2 or on a similar wireless LAN interface card 130 installed in access point AP1, AP2, respectively.

Here, the MAC device 11 is schematically depicted, showing only a signal-processing unit 12, a signal reception level detection circuit 13, an antenna 31 and an on-board memory 14 as needed for the description of this embodiment of the invention. The MAC device 11 may comprise other components not shown here. Also, the components 12,13,14 which are shown, may be separate devices or integrated into one device. As desired, the devices also may be implemented in the form of analog or digital circuits. The on-board memory 14 may comprise RAM, ROM, FlashROM and/or other types of memory devices, as are known in the art.

Figure 3:
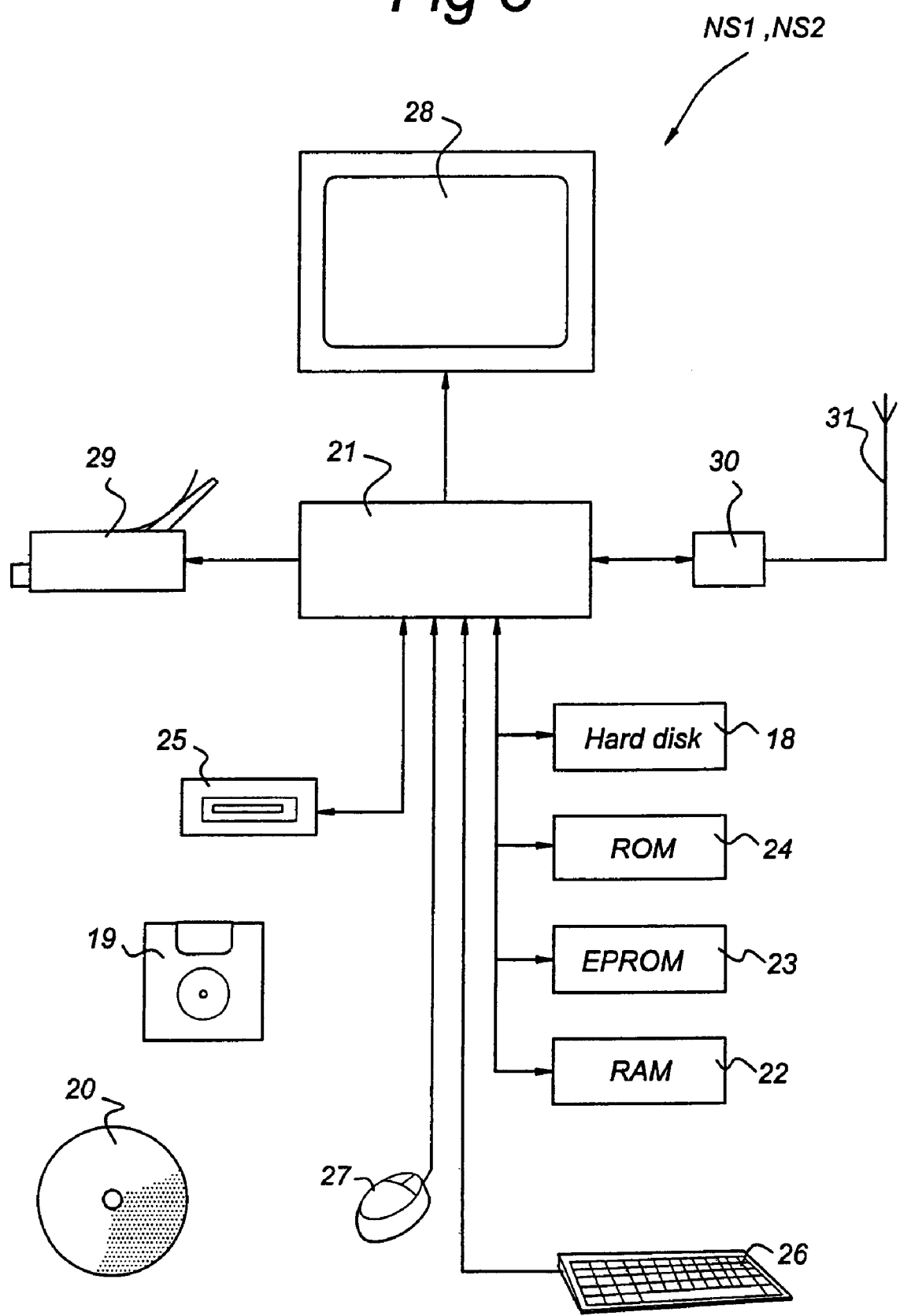
FIG. 3 shows a schematic block diagram of a network station in the present invention.

FIG. 3 shows a schematic block diagram of an embodiment of a network station NS1, NS2 comprising processor means 21 with peripherals. The processor means 21 is connected to memory units 18,22,23,24 which store instructions and data, one or more reading units 25 (to read, e.g., floppy disks 19, CD ROM's 20, DVD's, etc.), a keyboard 26 and a mouse 27 as input devices, and as output devices, a monitor 28 and a printer 29. Other input devices, like a trackball and a touch screen, and output devices may be provided for. For data-communication over the wireless LAN 1, and interface card 30 is provided. The interface card 30 connects to an antenna 31.

The memory units shown comprise RAM 22, (E)EPROM 23, ROM 24 and hard disk 18. However, it should be understood that there may be provided more and/or other memory units known to persons skilled in the art. Moreover, one or more of them may be physically located remote from the processor means 21, if required. The processor means 21 are shown as one box, however, they may comprise several processing units functioning in parallel or controlled by one main processor, that may be located remote from one another, as is known to persons skilled in the art.

In an alternative embodiment of the present invention, the network station 5,6 may be a telecommunication device in which the components of interface card 30 are incorporated as known to those skilled in the art.

Figure 4:
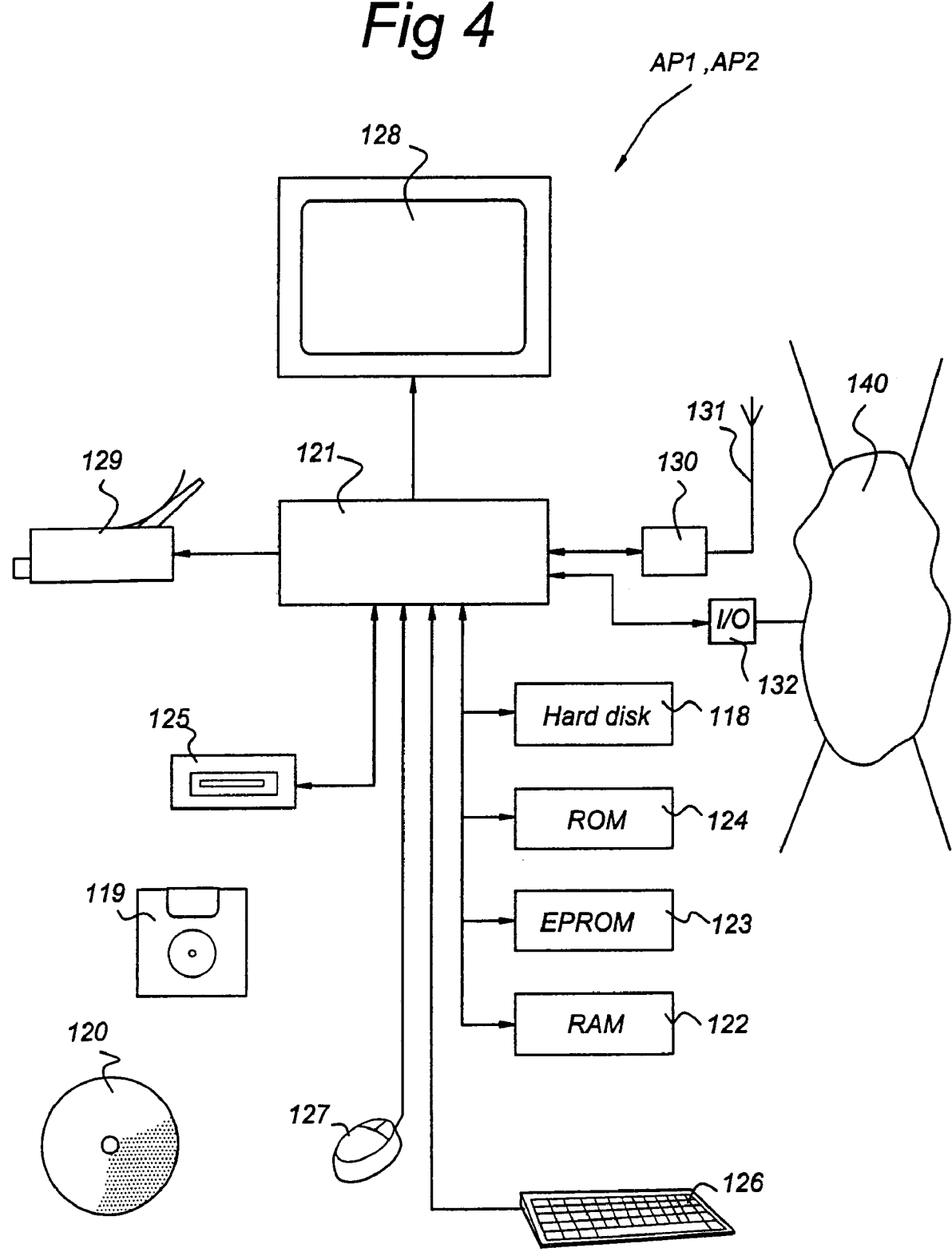
FIG. 4 shows a schematic block diagram of an access point (AP) in the present invention.

FIG. 4 shows a schematic block diagram of an embodiment of an access point AP1, AP2, AP3 comprising processor means 121 with peripherals. The processor means 121 are connected to memory units 118,122,123,124 which store instructions and data, one or more reading units 125 (to read, e.g., floppy disks 119, CD ROM's 120, DVD's, etc.), a keyboard 126 and a mouse 127 as input devices, and a output devices, a monitor 128 and a printer 129. For data-communication over the wireless LAN 1, an interface card 130 is provided. The interface card 130 connects to an antenna 131. Furthermore, the access point AP1, AP2, AP3 is connected to a wired distribution network 140 through I/O means 132 for communication with, e.g., other access points. The memory units shown comprise RAM 133, (E)EPROM 123, ROM 124 and hard disk 118. However, it should be understood that there may be provided more and/or other memory units known to persons skilled in the art. Moreover, one or more of them may be physically located remote from the processor means 121, if required. The processor means 121 are shown as one box, however, they may comprise several processing units functioning in parallel or controlled by one main processor, that may be located remote from one another, as is known to persons skilled in the art. Moreover, other input/output devices than those shown (i.e. 126,127,128,129) may be provided.

In an alternative embodiment of the present invention, the access point AP AP2, AP3 may be a telecommunication device in which the components of interface card 130 are incorporated as known to those skilled in the art.

The appearance of a new access point AP4 shown in FIG. 1c will cause sudden interference to AP1 because it is using channel C4=9 which has a channel distance less than 3 to the channel C1=10 of AP1. Now, in accordance with the invention, access point AP1 decides to start a swapping procedure.

Figure 5:
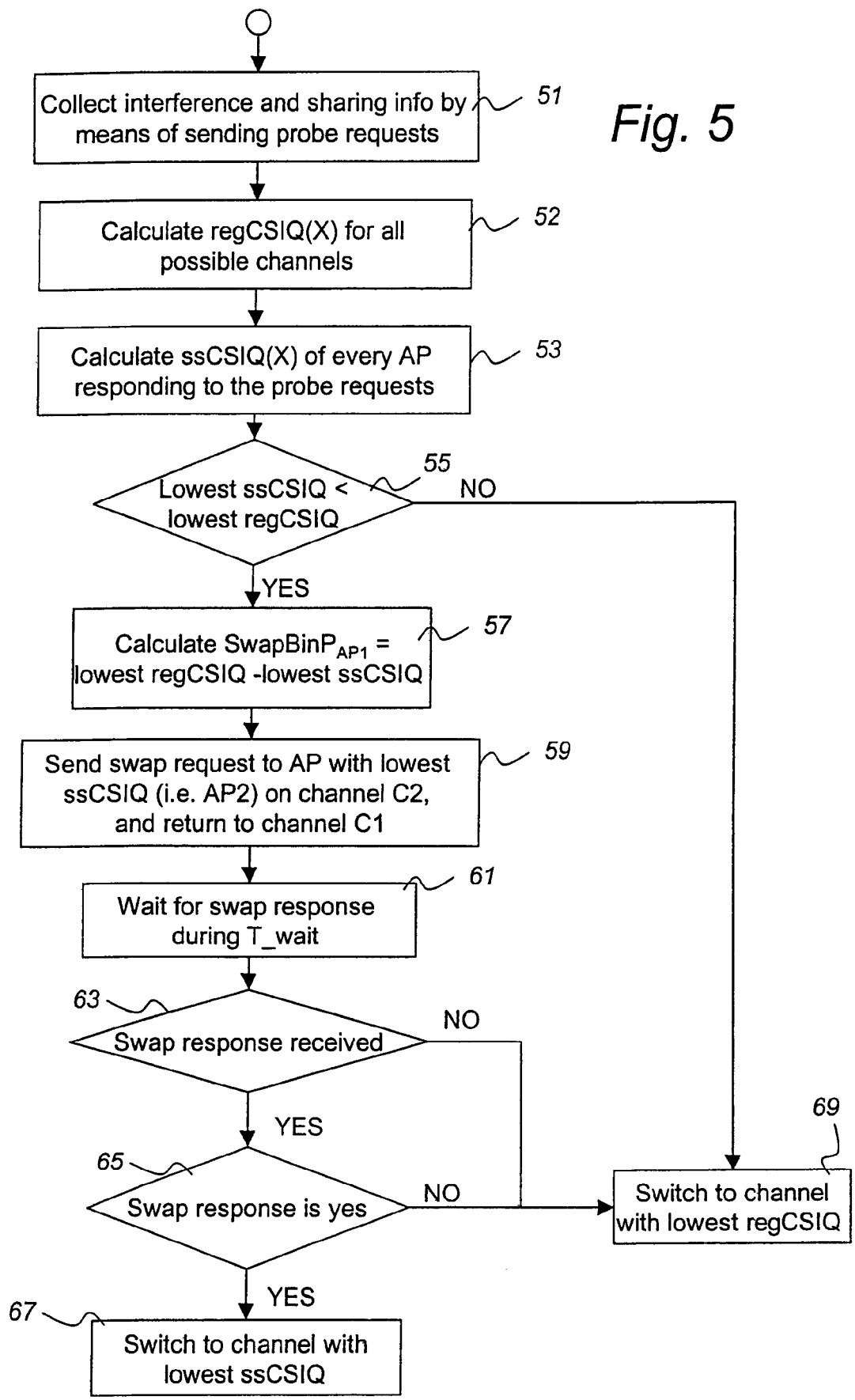
FIG. 5 shows a flow diagram of the swapping procedure of a requesting AP in the present invention.

FIG. 5 shows a flow diagram of the swapping procedure for the requesting access point AP1. In the procedure of FIG. 5 the following parameters are used:

regCSIQ this is a quality parameter calculated for every possible channel on which the AP can operate; its value is a measure for both channel sharing and interference for the channel concerned. The formula is given by:

$$regCSIQ(X)=CS(X)+CorFac \times I(X)$$

In contrast with the CSIQ in the Awater 12-23-14 application, the lower the value for regCSIQ(X), the better the channel X. The formulas for CS (X) and 1(X) are found in the Awater 12-23-14 application; the parameter CorFac is a correction factor that is preferably equal to 1.

ssCSIQ swap specific CSIQ; this is a specially calculated quality parameter. The formula is given by:

$$ssCSIQ(X)=regCSIQ'(X)+SwapPenalty$$

where regCSIQ'(X) is calculated in the same was as regCSIQ(X) but under the assumption that a responding AP already uses the channel of a requesting AP, i.e., a situation is assumed in which swapping has already occurred. The SwapPenalty is a parameter indicating that swapping is associated with a certain penalty. It may be zero but preferably it has a positive value, e.g. 10.

At the start of the swapping procedure, access point AP1 is using channel C1=10. At step 51 the requesting access point AP1 collects interference and sharing information by means of sending Probe Requests to other APs. Then at step 52, AP1 calculates the regCSIQ values for all possible channels. At step 53, AP1 calculates a swap specific CSIQ (ssCSIQ) for every channel used by any AP responding to the Probe Request. For the calculation of the swap specific CSIQ values, the formula for regCSIQ is used, but with the assumption that the responding access points AP2, AP3 are not using the channel on which they are actually operating, but the channel on which the requesting AP is operating.

The swap specific CSIQ value is increased by a certain amount, (e.g., by 10). A swap should not be executed when it is not necessary, because of possible overhead costs. By increasing the ssCSIQ by e.g. 10, it becomes more likely that a channel with a regular CSIQ is selected for switching and swapping is not necessary.

Now at step 55, the lowest CSIQ is determined out of all the calculated regCSIQ values and all the ssCSIQ values. If the lowest ssCSIQ is smaller than the lowest regCSIQ the procedure will go on to step 57. If this in not the case step 69 will be executed. At step 57, AP1 calculates the difference between the lowest regCSIQ and the lowest ssCSIQ. This difference, named SwapBinP$_{AP1}$, is the benefit in performance for AP1 if AP1 would swap channels (with the AP corresponding to the lowest ssCSIQ) instead of switching its channel to the channel corresponding to the lowest regCSIQ. At step 59, a Swap Request is sent using the channel corresponding to the lowest ssCSIQ value. The swap request contains the channel C1 of AP1 requesting the swap, and it also contains the value for SwapBinP$_{AP1}$.

Now at step 61, the access point AP1 will wait for a Swap Response during a predefined time period T_wait. If AP1 has received a Swap Response within T_wait ms, the result of step 63 is YES and step 65 follows. If the result of the test at step 63 is NO, then the next step will be step 69 and the channel will be switched to a channel Cs, corresponding to the lowest regCSIQ.

At step 65, the Swap Response is checked. If the Swap Response is 'yes', then step 67 follows. This means that AP1 will change its channel to the value of the one of the responding access point AP2 (i.e., C2). If at step 65 the Swap Response is 'no', step 69 will be executed and AP1 will switch to said channel C5.

Figure 6:
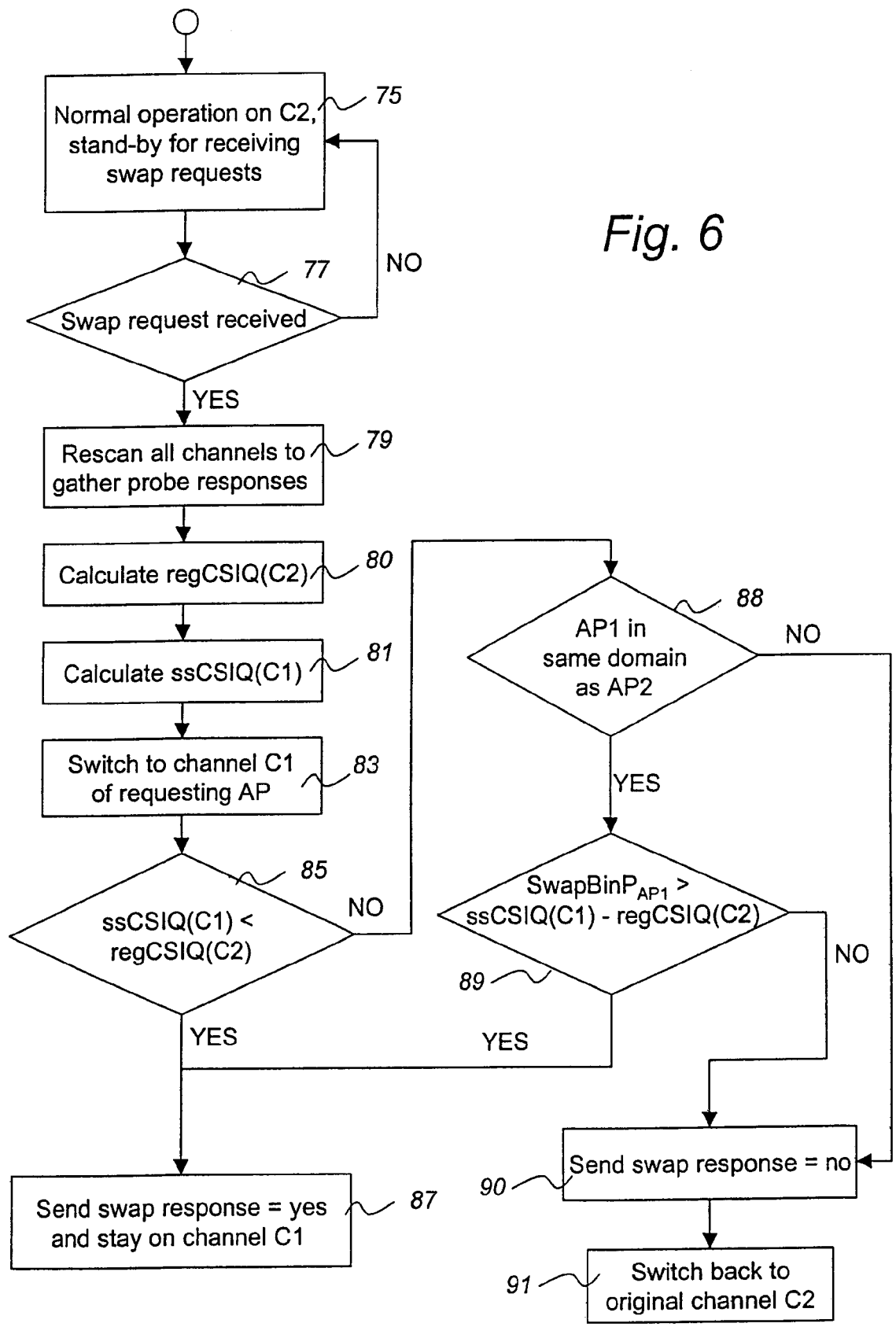
FIG. 6 shows a flow diagram of the swapping procedure of a responding AP in the present invention.

FIG. 6 shows a flow diagram of the swapping procedure for the responding access point AP2. At the start of the procedure, access point AP2 is using channel C2=6. At step 75, access point AP2 is operating normally and is stand-by for any Swap Request. If, at step 77, a request is received, AP2 will proceed to step 79. If no Swap Request is received AP2 will stay at step 75. At step 79, the access point AP2 will rescan all the channels in order to get the Probe Responses of neighbouring APs. During the scan of a channel X, AP2 switches to the channel in question (i.e. X) and configures itself temporarily to the lowest defer threshold and bit rate to allow communication over as large as possible distance, see circle 45 in FIG. 1c. AP2 sends a Probe Request frame to evoke a probe Response from all APs tuned to the channel in question and within radio range. The Probe Response packets sent by the APs responding to the Probe Request, carry information on load factors from each AP using the channel in question. The gathered load information from all the probe-responding APs together with the receive levels of the Probe Responses, are stored by AP2. This is done for all the channels and in the same way as in the Awater 12-23-14 application.

Next, at step 80, the regCSIQ value for the operating channel of AP2 is calculated. This means regCSIQ(C2) is calculated. At step 81, the value of ssCSIQ is calculated for the channel that is used by the swap requesting AP1. This means ssCSIQ(C1) is calculated using the load and receive level information stored by AP2 at step 79. Then at step 83, access point AP2 switches its channel to the one of the swap requesting AP1 (i.e., C1). At step 85, the value of ssCSIQ(C1) is compared to the value of regCSIQ(C2). If ssCSIQ(C1) is lower than regCSIQ(C2), then access point AP2 will send a Swap Response 'yes' at step 87. If ssCSIQ(C1) is not lower than regCSIQ(C2) the procedure will go to step 88. In step 88 the administrative domain (e.g. company or organization) of AP1 is compared with the one of AP2. If the domains are not the same, step 90 is executed. If the two domains match, then step 89 will follow in which another, so-called 'sacrifice' test is done. At this step the benefit in performance for, and predicted by, requesting AP1 (i.e., $SwapBinP_{AP1}$, e.g., the difference between the lowest of all regular channel quality parameters (regCSIQ) and the lowest of all swap specific channel quality parameters (ssCSIQ)) is compared to the predicted decrease in performance for AP2 (i.e., ssCSIQ (C1)−regCSIQ(c2)). If the benefit in performance for AP1 is higher than the decrease in performance for AP2, access point AP2 will sacrifice its channel and will agree to swap channels. This means that step 87 will follow. If the answer to the test in step 88 is NO, then step 90 follows. This means that AP2 will send a Swap Response 'no' to the swap requesting AP1. After this, AP2 will switch its channel back to CS=6, see step 91.

The swapping procedure described above is not a low-overhead solution. Therefore, it should not be attempted frequently. It should only be attempted once per channel change. Once a swap has failed for a certain AP, it should not be attempted in the near future. Therefore, the information record that exists for every DFS-capable AP, also contains a timer. This timer is used to ensure that swap requests to the same AP are separated by a certain number of hours (i.e., 24).

What is claimed:

1. A first access point for a wireless LAN communication network, wherein the first access point is adapted to:
   (a) send probe requests and probe responses to other access points,
   (b) receive probe requests and probe responses from other access points,
   (c) calculate an interference parameter for each of a plurality of its possible channels,
   (d) calculate a channel sharing parameter for each of the plurality of channels,
   (e) calculate a regular channel quality parameter (regCSIQ) for each of the plurality of channels, indicative of the amount of interference and channel sharing on each of the plurality of channels, using the interference and channel sharing parameters, and
   (f) dynamically select a new channel from the plurality of possible channels using the regular channel quality parameters (regCSIQ), wherein:
      the first access point is arranged to select the new channel by mutually swapping channels with a second access point using a swapping mechanism in which:
         the new channel for the first access point is the previous channel for the second access point; and
         the new channel for the second access point is the previous channel for the first access point; and
      the first access point is further adapted to monitor traffic load, wherein the probe responses include traffic load information (i) carried in the probe responses and (ii) corresponding to the traffic load at the access points that send the probe responses.

2. The first access point according to claim 1, wherein the first access point is a swap requesting access point (AP1), operating on a first channel (C1), that calculates and stores a swap specific channel quality parameter (ssCSIQ) for every responding access point (AP2) operating on a second channel (C2), the swap specific channel quality parameter (ssCSIQ) being calculated under the assumption that every responding access point (AP2) and the swap requesting access point (AP1) have already swapped channels, which swap specific channel quality parameter is used in the swapping mechanism.

3. The first access point according to claim 1, wherein the first access point is arranged to use the swapping mechanism only after a predetermined time has lapsed since a last time of using the swapping mechanism.

4. The first access point according to claim 1, wherein:
   the wireless LAN communication network uses a carrier sense multiple access with collision avoidance (CSMA/CA) protocol; and
   the first access point is adapted to communicate with multiple network stations using a single channel under the CSMA/CA protocol.

5. A wireless LAN communication network comprising at least two access points according to claim 1.

6. The wireless LAN communication network according to claim 5, wherein:
   the wireless LAN communication network uses a carrier sense multiple access with collision avoidance (CSMA/CA) protocol; and
   the first access point is adapted to communicate with multiple network stations using a single channel under the CSMA/CA protocol.

7. Method of selecting a new channel by a first access point in a wireless LAN communication network, comprising the steps of:
   (a) sending probe requests and probe responses to other access points;
   (b) receiving probe requests and probe responses from other access points;
   (c) calculating an interference parameter for each of a plurality of its possible channels;
   (d) calculating a channel sharing parameter for each of the plurality of channels;
   (e) calculating a regular channel quality parameter (regCSIQ) for each of the plurality of channels, indicative of the amount of interference and channel sharing on each of the plurality of channels, using the interference and channel sharing parameters; and
   (f) dynamically selecting the new channel from the plurality of possible channels using the regular channel quality parameters (regCSIQ), wherein:
      the first access point is arranged to select the new channel by mutually swapping channels with a second access point using a swapping mechanism in which:
         the new channel for the first access point is the previous channel for the second access point; and
         the new channel for the second access point is the previous channel for the first access point; and
      the first access point monitors traffic load, wherein the probe responses include traffic load information (i) carried in the probe responses and (ii) corresponding to the traffic load at the access points that send the probe responses.

8. A method according to claim 7, wherein the first access point is a swap requesting access point (AP1), operating on a first channel (C1), that calculates and stores a swap specific channel quality parameter (ssCSIQ) for every responding access point (AP2) operating on a second channel (C2), the swap specific channel quality parameter (ssCSIQ) being calculated under the assumption that every responding access point (AP2) and the swap requesting access point (AP1) have already swapped channels, which swap specific channel quality parameter is used in the swapping mechanism.

9. The method according to claim 7, wherein:
   the wireless LAN communication network uses a carrier sense multiple access with collision avoidance (CSMA/CA) protocol; and
   the first access point is adapted to communicate with multiple network stations using a single channel under the CSMA/CA protocol.

10. The first access point according to claim 1, wherein, following failure of a first swap request received from an other access point to swap channels with the other access point, the first access point sets a timer that prevents processing of another swap request for the predetermined time.

11. The first access point according to claim 1, wherein the channel sharing parameter is calculated as a function of the traffic load for the corresponding channel.

12. The method according to claim 7, wherein the channel sharing parameter is calculated as a function of the traffic load for the corresponding channel.

* * * * *